United States Patent [19]

Schmid et al.

[11] Patent Number: 4,532,076

[45] Date of Patent: Jul. 30, 1985

[54] AQUEOUS ANIONIC SURFACTANT CONCENTRATES CONTAINING VISCOSITY REDUCING AGENTS

[75] Inventors: Karl Schmid, Mettmann; Horst Baumann, Leichlingen; Hans J. Rommerskirchen, Duesseldorf, all of Fed. Rep. of Germany

[73] Assignee: Henkel Kommanditgesellschaft auf Aktien, Duesseldorf, Fed. Rep. of Germany

[21] Appl. No.: 543,672

[22] Filed: Oct. 19, 1983

[30] Foreign Application Priority Data

Feb. 11, 1982 [DE] Fed. Rep. of Germany ....... 3240403

[51] Int. Cl.[3] ......................... C11D 1/28; C11D 3/26; C11D 3/34; G05D 24/00

[52] U.S. Cl. .................................. 252/557; 252/89.1; 252/142; 252/143; 252/153; 252/170; 252/171; 252/173; 252/174.19; 252/541; 252/545; 252/546; 252/549; 252/DIG. 14

[58] Field of Search ............... 252/DIG. 11, DIG. 13, 252/DIG. 14, 89.1, 142, 139, 143, 173, 530, 535, 538, 554, 557, 541, 545, 546, 549

[56] References Cited

U.S. PATENT DOCUMENTS

| | | | |
|---|---|---|---|
| 2,195,187 | 3/1940 | Moyer | 260/400 |
| 3,151,084 | 9/1964 | Schiltz | 252/527 |
| 3,338,838 | 8/1967 | Wilson | 252/557 |
| 3,345,301 | 10/1967 | Stein | 252/557 |
| 3,377,289 | 4/1968 | Stein | 252/109 |
| 3,377,290 | 4/1968 | Stein | 252/557 |
| 3,413,221 | 11/1968 | Gotte | 252/557 |
| 3,415,753 | 12/1968 | Stein | 252/121 |
| 3,630,929 | 12/1971 | Van Dijk | 252/136 |
| 3,882,038 | 5/1975 | Clayton | 252/164 |
| 3,883,447 | 5/1975 | Tokiwa | 252/546 |
| 3,893,955 | 7/1975 | Hewitt et al. | 252/551 |
| 3,899,448 | 8/1975 | Messenger et al. | 252/551 |
| 3,914,185 | 10/1975 | Inamorato | 252/546 |
| 3,915,903 | 10/1975 | Wise | 252/552 |
| 3,954,643 | 5/1976 | Krings | 252/96 |
| 4,003,857 | 1/1977 | Gorsich | 252/546 |
| 4,061,586 | 12/1977 | Klisch | 252/153 |
| 4,107,095 | 8/1978 | Klisch | 252/541 |
| 4,203,873 | 5/1980 | Suzuki | 252/545 |
| 4,239,641 | 12/1980 | Perner et al. | 252/142 |
| 4,279,786 | 7/1981 | Sekiguchi | 252/536 |
| 4,384,978 | 5/1983 | Ploog | 252/353 |
| 4,414,128 | 11/1983 | Goffinet | 252/111 |
| 4,416,809 | 11/1983 | Magari | 252/557 |

FOREIGN PATENT DOCUMENTS

| | | |
|---|---|---|
| 991502 | 6/1976 | Canada . |
| 0008060 | 2/1980 | European Pat. Off. . |
| 0024711 | 8/1980 | European Pat. Off. . |
| 2251405 | 4/1973 | Fed. Rep. of Germany . |
| 2305554 | 8/1973 | Fed. Rep. of Germany . |
| 2326006 | 12/1973 | Fed. Rep. of Germany . |
| 1617160 | 4/1975 | Fed. Rep. of Germany . |
| 1437089 | 5/1976 | United Kingdom . |

*Primary Examiner*—Dennis L. Albrecht
*Attorney, Agent, or Firm*—Ernest G. Szoke; Henry E. Millson, Jr.; Mark A. Greenfield

[57] ABSTRACT

An aqueous anionic surfactant concentrate containing certain low molecular weight organic compounds as viscosity regulators and a method of regulating the viscosity of highly viscous concentrates, e.g. α-sulfo fatty acid ester surfactants in concentrations about 30% by weight. The viscosity regulators are selected from:

(a) a $C_1$–$C_6$-alkyl monocarboxylic acid substituted in the α-position by a halogen, cyano or sulfo group, a salt thereof, or an ester thereof with a $C_1$–$C_6$-alkanol, (b) a $C_1$–$C_6$-alkylene dicarboxylic acid substituted in the α-position by a halogen, cyano or sulfo group, a salt thereof, or an ester thereof with a $C_1$–$C_6$-alkanol, (c) nitrilotriacetic acid and its salts, (d) an ether alcohol containing from 2 to 4 alkylene glycol units and 1 alkoxy group, (e) and mixtures thereof.

11 Claims, No Drawings

AQUEOUS ANIONIC SURFACTANT CONCENTRATES CONTAINING VISCOSITY REDUCING AGENTS

This invention relates to aqueous anionic surfactant concentrates containing certain low molecular weight organic compounds as viscosity regulators and to a method of regulating the viscosity of highly viscous anionic surfactant concentrates.

BACKGROUND OF THE INVENTION

In the commercial production of powder-form or granular detergents and cleaners a spray drying process is normally used, such as by hot spraying in a tower. The starting material that is spray dried is an aqueous suspension or slurry which contains a high percentage of, or even all, the detergent ingredients. From an economic point of view, it is important that the slurry should contain as high a percentage of detergent ingredients as possible, i.e. as low a percentage as possible of liquid ballast. Accordingly, the smallest possible quantity of water is used for preparing the slurries. However, the concentration is limited by the highest possible viscosity at which the slurry can still be processed, i.e. pumped and sprayed.

An essential ingredient of most detergents and cleaners are anionic surfactants which are generally used as pastelike concentrates in the form of their alkali metal or ammonium salts in the production of the detergent slurry. In the case of α-sulfo tallow fatty acid methyl ester, for example, the surfactant content of industrial concentrates amounts to approximately 30% by weight. However, pastes of such surfactant having a higher surfactant content can not be processed successfully. U.S. Pat. No. 2,195,187 describes α-sulfo-fatty acids and their esters as surface-active compounds or surfactants. Also, German Application No. 12 46 718, for example, describes a process for the preparation of this class of compounds.

One peculiar aspect of the rheological behavior of these surfactant concentrates lies in the fact that they react to the addition of water not by a reduction in viscosity, but instead by an increase in viscosity to a gel-like state which presents the processor with additional problems. For example, it is often not easy to redissolve gel lumps once they have formed, and the valves of pumps and containers become blocked.

Various solutions to these problems have been proposed. For example, German Application No. 22 51 405 (corresponding to U.S. Pat. No. 3,893,955) describes the salts of certain carboxylic acids, particularly hydroxy carboxylic acids, as viscosity regulators. According to the teaching of German application No. 23 05 554 (corresponding to U.S. Pat. No. 3,899,448) sulfonated aromatic compounds are suitable for this purpose. German Application No. 23 26 006 (British equivalent No. 1,437,089; Canadian equivalent No. 991,502) discloses sulfates or sulfonates of aliphatic, optionally substituted hydrocarbons as viscosity regulators. The addition of lower alkanols is also mentioned in the cited publications as a means for reducing viscosity. The addition of well known hydrotropes, such as for example cumene sulfonate, or of acidic phosphoric acid esters is mentioned in German application No. 16 17 160 while the addition of polyhydric alcohols and the addition of certain carboxylic acids and/or esters of these compounds is described in EP No. 8060 A (corresponding to U.S. Pat. No. 4,239,641). It is known from EP No. 24 711 A (New Zealand equivalent No. 8,005,342) that sulfates of certain polyalkyl ether glycols can be added to improve the rheological behavior of anionic surfactant concentrates.

Some of the additives mentioned in the literature do not work in all surfactant concentrates, some have to be used in high concentrations, while others, such as lower alkanols, reduce the flash point of the concentrates.

DESCRIPTION OF THE INVENTION

An object of the invention is to provide aqueous anionic surfactant concentrates having improved rheological behavior so that they may be processed in higher concentrations than in the past and do not undergo an increase in viscosity on dilution with water.

Another object of the invention is to provide a method of reducing the viscosity of highly viscous anionic surfactant concentrates, particularly concentrates of α-sulfo fatty acid esters.

It has now been discovered that the viscosity of highly viscous concentrates of anionic surfactants, particularly of α-sulfo fatty acid esters, can be regulated by the use of certain low molecular weight organic compounds. These compounds when employed in concentrate compositions provide improved rheological behavior so that the concentrates can be handled without difficulty in the processing thereof. The compounds which find utility as viscosity regulators herein are the following:

(a) a $C_1$–$C_6$-alkyl monocarboxylic acid substituted in the α-position by a halogen, cyano or sulfo group, or a salt thereof, or an ester thereof with a $C_1$–$C_6$ alkanol, preferably with ethanol or methanol;
(b) a $C_1$–$C_6$-alkylene dicarboxylic acid substituted in the α-position by a halogen, cyano or sulfo group, or a salt thereof, or an ester thereof with a $C_1$–$C_6$ alkanol, preferably with ethanol or methanol;
(c) nitrilotriacetic acid, or a salt thereof;
(d) an ether alcohol containing from 2 to 4 alkylene ($C_2$–$C_6$) glycol units and one $C_1$–$C_6$ alkoxy group, preferably a methoxy or ethoxy group.

The viscosity regulator of the invention can be any single compound from each group above, a mixture of compounds within each such group, or a mixture of compounds from different groups. In reference to the use of the salts, it is to be understood that the term "salt" includes the alkali metal, alkaline earth metal, lower alkyl amine, $C_2$–$C_6$ alkanolamine, and ammonium salts. The sodium salt is the preferred salt.

The viscosity regulator is added to a highly viscous commercial aqueous concentrate of a synthetic anionic surfactant, especially to aqueous concentrates of an α-sulfo fatty acid ester containing at least 30% by weight of α-sulfo fatty acid ester; the viscosity regulator being added in a quantity of from about 1 to about 15% by weight, preferably from about 7 to about 12% by weight, and most preferably about 10% by weight, based on the weight of surfactant, so that the viscosity of the concentrate is reduced to at most 10,000 mPas at 70° C.

In other words, the viscosity of the concentrates at the particular processing temperature, i.e. at the temperature at which the surfactant concentrates are prepared, pumped, mixed with other detergent ingredients as desired, and spray dried, e.g. by hot spraying in a tower, which is generally done at 60° to 90° C., can be reduced to a viscosity suitable for such processing of at most 10,000 mPas.

Another very significant advantage afforded by the novel concentrates of the invention lies in the fact that, in the commercial production of these surfactant concentrates, the surfactant content can be adjusted to values of up to about 60% by weight without the viscosity of the concentrates exceeding the upper processing limit of approximately 10,000 mPas, so that surfactant concentrates containing comparatively little water as ballast are obtained. In addition, when these concentrates are diluted, they do not undergo the temporary increase in viscosity otherwise observed—which is another distinct advantage with respective to their processing.

The particular concentrate level which can be achieved without exceeding the 10,000 mPas viscosity, will of course depend on the particular anionic surfactant concentrate and other ingredients therein. To a large measure the required reduction in the viscosity of the concentrate is determined by the quantity of viscosity regulator added. The viscosity reducing effect is particularly pronounced at low pH values, i.e. at pH values below 7.

Viscosity regulation is a particular problem for concentrates of α-sulfo fatty acid esters because concentrates having a surfactant content of just beyond about 30% by weight can no longer be processed successfully. Without the viscosity problem, it would be technically possible to produce surfactant concentrates having a surfactant content of up to about 80% by weight. Accordingly, reducing the viscosity of α-sulfo fatty acid ester concentrates is a particularly important object of the present invention.

The more desirable viscosity regulators of group (a) and (b) above are those derived from acetic acid, succinic acid or malonic acid, particularly in the form of their sodium salts. Illustrative of such compounds are the sodium salts of monochloroacetic acid, α-sulfosuccinic acid, α-sulfomalonic acid, α-sulfoacetic acid, α-sulfoacetic acid methyl ester, cyanoacetic acid and cyanoacetic acid ethyl ester. Dipropylene glycol monomethyl ether is also suitable for use as a viscosity regulator. This compound, which is one of the type (d) viscosity regulators given above, is an ether alcohol containing 2 propylene glycol units and 1 methoxy group. Compounds of type (d) in which the alkylene groups are in the form of ethylene glycol or trimethylene glycol units are also suitable, as are compounds in which the alkoxy groups are ethoxy, propoxy or butoxy groups. However, ether alcohols containing propylene glycol units and methoxy groups are preferred. Additions of 10% by weight of the sodium salts of nitrilotriacetic acid, α-sulfoacetic acid methyl ester, chloracetic acid and cyanoacetic acid ethyl ester have proved to be particularly effective. Accordingly, these compounds are preferred.

Anionic surfactants are old and well known materials. This invention is applicable to any anionic surfactant which at a certain concentration level reaches a viscosity which renders it handleable or processable only with difficulty. Examples of the anionic surfactant concentrates to which the present invention is directed are those which contain one or more of the following anionic surfactants:

I. α-Sulfo fatty acid esters (SFE)

These surfactants are derivatives of fatty acids with 10 to 20, preferably 12 to 18 carbon atoms, and aliphatic alcohols with 1 to 10, preferably 1 to 4 carbon atoms in the molecule. The introduction of the sulfo group is achieved either by sulfonation of the fatty acid with subsequent esterification of the carboxyl group with alcohol, or sulfonation of the appropriate fatty acid ester. Both processes will yield esters of sulfo fatty acids which have the sulfo acid group in the α-position. Especially suitable α-sulfo fatty acid esters to be used as surfactants are the alkali metal or ammonium salts of the methyl and ethyl esters of tallow fatty acids with a sulfo group in the α-position, and with the acid component consisting mainly of saturated $C_{16}$ and $C_{18}$ fatty acids. The salts are prepared by neutralizing the acid esters with the corresponding bases.

II. Alkyl Sulfates (FAS)

Surfactants of this group consist of sulfuric acid esters of fatty alcohols. The alcohol component can be saturated or unsaturated, and has, as a rule, 8 to 24, preferably 10 to 18 carbon atoms. The alcohol can be a derivative of coconut oil or tallow fat. These alkyl sulfates are usually in the form of their alkali metal or ammonium salts.

III. Alkylaryl sulfonates (ABS)

ABS are usually sulfonation products of an alkyl benzene. The alkyl group can be straight or branched chain, saturated, or unsaturated. Preferred is an alkyl radical with 4 to 16, preferably 6 to 14 carbon atoms. Especially important are ABS having alkyl radicals with 8 to 12 carbon atoms. ABS are usually available as their alkali metal or ammonium salts.

In addition to the above viscosity regulators of the invention, other compounds containing electron-attracting groups can also be added to the concentrates of the invention in small quantities, e.g. from about 1 to about 10% by weight, based on the weight of surfactant, to effect an additional reduction in viscosity. An example of a compound such as this is the sodium salt of vinyl sulfonate.

The following examples will serve to further illustrate the invention, in which examples, all parts and percentages are by weight unless otherwise indicated.

EXAMPLES 1-6

In order to illustrate the effectiveness of viscosity regulators, viscosities were determined using various viscosity regulators on the sodium salt of α-sulfotallow fatty acid methyl ester surfactant at concentrations of about 50 to about 60% by weight. The α-sulfotallow fatty acid methyl ester sodium salt was a commercially prepared product having a degree of sulfonation of 97.4% and a paste concentration of 30% by weight surfactant. The paste was concentrated by evaporation to dryness.

The powder obtained above was used for preparing the concentrates in the concentration indicated in the following Table which were verified by titration according to Epton. The following viscosity regulators were added to the concentrates:

A=α-sulfoacetic acid methyl ester, sodium salt
B=chloracetic acid, sodium salt
C=cyanoacetic acid ethyl ester